United States Patent
Gan et al.

(10) Patent No.: US 12,057,941 B2
(45) Date of Patent: Aug. 6, 2024

(54) DATA PACKET ACKNOWLEDGMENT METHOD, APPARATUS, DEVICE, AND COMPUTER-READABLE STORAGE MEDIUM

(71) Applicant: HUAWEI TECHNOLOGIES CO., LTD., Shenzhen (CN)

(72) Inventors: Ming Gan, Shenzhen (CN); Xun Yang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 646 days.

(21) Appl. No.: 17/171,145

(22) Filed: Feb. 9, 2021

(65) Prior Publication Data
US 2021/0167895 A1  Jun. 3, 2021

Related U.S. Application Data

(63) Continuation of application No. PCT/CN2019/100565, filed on Aug. 14, 2019.

(30) Foreign Application Priority Data

Aug. 14, 2018 (CN) .......................... 201810926932.7

(51) Int. Cl.
*H04L 1/1607* (2023.01)
*H04L 5/00* (2006.01)
(Continued)

(52) U.S. Cl.
CPC .......... *H04L 1/1621* (2013.01); *H04L 5/0055* (2013.01); *H04W 28/06* (2013.01); *H04W 80/08* (2013.01)

(58) Field of Classification Search
CPC ... H04L 1/1621; H04L 5/0055; H04L 1/1671; H04L 1/1854; H04L 1/1896;
(Continued)

(56) References Cited

U.S. PATENT DOCUMENTS 10,080,222 B1 * 9/2018 Chu ...................... H04L 5/0053
10,158,474 B2 * 12/2018 Cherian ................ H04L 1/1685
(Continued)

FOREIGN PATENT DOCUMENTS

CN    105391520 A    3/2016
CN    106656429 A    5/2017
(Continued)

OTHER PUBLICATIONS

O. Cabral, A. Segarra, F. J. Velez, A. Mihovska and N. R. Prasad, "Optimization of multi-service IEEE802.11e block acknowledgement," 2009 IEEE Radio and Wireless Symposium, San Diego, CA, USA, 2009, pp. 380-383, (Year: 2009).*
(Continued)

*Primary Examiner* — Ayaz R Sheikh
*Assistant Examiner* — Tarell A Hampton
(74) *Attorney, Agent, or Firm* — Maier & Maier, PLLC

(57) ABSTRACT

A data packet acknowledgment method, apparatus, and device, and a computer-readable storage medium. The method includes: receiving, by a first station, at least one first data packet in a plurality of data packets sent by a second station on a plurality of spectrum resources, and replying acknowledgment information of the at least one first data packet to the second station based on multi-service indication information carried in the at least one first data packet, to avoid a problem of confusion in acknowledgment information of the plurality of data packets.

18 Claims, 5 Drawing Sheets

(51) Int. Cl.
*H04W 28/06* (2009.01)
*H04W 80/08* (2009.01)

(58) Field of Classification Search
CPC .... H04L 1/1614; H04L 1/1607; H04W 28/06; H04W 80/08; H04W 28/04
See application file for complete search history.

(56) References Cited

U.S. PATENT DOCUMENTS

| | | | |
|---|---|---|---|
| 2005/0238016 A1* | 10/2005 | Nishibayashi | H04L 47/28 370/389 |
| 2008/0080437 A1* | 4/2008 | Krishnaswamy | H04L 1/1671 370/338 |
| 2011/0305176 A1 | 12/2011 | Wentink | |
| 2013/0301569 A1* | 11/2013 | Wang | H04L 1/1864 370/329 |
| 2014/0079016 A1* | 3/2014 | Dai | H04L 5/0041 370/329 |
| 2015/0036673 A1 | 2/2015 | Asterjadhi et al. | |
| 2017/0048048 A1* | 2/2017 | Seok | H04L 1/1607 |
| 2017/0055300 A1* | 2/2017 | Pitchaiah | H04W 76/11 |
| 2017/0111951 A1* | 4/2017 | Chu | H04L 1/1671 |
| 2017/0149547 A1* | 5/2017 | Kim | H04L 1/1685 |
| 2017/0257189 A1* | 9/2017 | Jiang | H04L 1/0079 |
| 2017/0289844 A1* | 10/2017 | Son | H04L 1/0084 |
| 2017/0373813 A1 | 12/2017 | Asterjadhi et al. | |
| 2018/0020460 A1* | 1/2018 | Hedayat | H04W 72/121 |
| 2018/0034595 A1* | 2/2018 | Kim | H04L 1/1685 |
| 2018/0184233 A1 | 6/2018 | Alpert et al. | |
| 2018/0332502 A1* | 11/2018 | Chu | H04L 1/1671 |
| 2019/0253194 A1* | 8/2019 | Jiang | H04L 1/1671 |

FOREIGN PATENT DOCUMENTS

| | | |
|---|---|---|
| CN | 107548104 A | 1/2018 |
| WO | 2016186310 A1 | 11/2016 |

OTHER PUBLICATIONS

Y. Do, S. Lee and S.-C. Park, "Adaptive Acknowledgment schemes of the IEEE 802.11e EDCA," The 9th International Conference on Advanced Communication Technology, Gangwon, Korea (South), 2007, pp. 1679-1683, doi: 10.1109/ICACT.2007.358693. (Year: 2007).*

Bingning Zhu et al. "Enhanced Block ACK in Distributed Coordination Function for Next Generation Network." 9th International Conference on Communications and Networking in China. Mar. 5, 2015. pp. 409-503.

* cited by examiner

DATA PACKET ACKNOWLEDGMENT METHOD, APPARATUS, DEVICE, AND COMPUTER-READABLE STORAGE MEDIUM

CROSS-REFERENCE TO RELATED APPLICATIONS

This application is a continuation of International Application No. PCT/CN2019/100565, filed on Aug. 14, 2019, which claims priority to Chinese Patent Application No. 201810926932.7, filed on Aug. 14, 2018. The disclosures of the aforementioned applications are hereby incorporated by reference in their entireties.

TECHNICAL FIELD

The embodiments relate to the field of communications technologies, and in particular, to a data packet acknowledgment method, apparatus, and device, and a computer-readable storage medium.

BACKGROUND

To significantly improve a service transmission rate of a wireless local area network (WLAN) system, the Federal Communications Commission (FCC) opens a new free frequency band 5925 MHz to 7125 MHz (6 GHz for short). The Institute of Electrical and Electronics Engineers (IEEE) 802.11ax standard also extends operating frequency bands of IEEE 802.11ax devices from 2.4 GHz and 5 GHz to 2.4 GHz, 5 GHz, and 6 GHz. The IEEE 802.11 next-generation Wi-Fi standard extremely high throughput (EHT) also supports the operating frequency bands of the 802.11ax devices, to be specific, supports the 2.4 GHz, 5 GHz, and 6 GHz frequency bands. In addition to a continuous ultra-wide bandwidth of the 6 GHz frequency band, the Wi-Fi EHT standard may further use a multi-band aggregation technology to aggregate discontinuous frequency bands to constitute an ultra-wide bandwidth. In addition, a first station that supports the Wi-Fi EHT standard may further send, by using a plurality of frequency bands, a plurality of data packets to a second station that supports the Wi-Fi EHT standard, to further improve the service transmission rate.

In the related art, after receiving a plurality of data packets (including at least one first data packet) that belong to a same service and that are sent by the second station by using the plurality of frequency bands, where the first data packet is an acknowledgment frame Ack enabled single one MAC protocol data unit (MPDU), the first station needs to reply acknowledgment information to the second station for each received data packet, where the acknowledgment frame is replied for the first received data packet, and the acknowledgment frame carries address information of the second station. For example, the second station sends a plurality of first data packets by using the plurality of frequency bands. When one of the first data packets is successfully received by the first station, the first station sends the acknowledgment frame to the second station, where the acknowledgment frame includes the address information of the second station.

Because the acknowledgment frame carries only the address information of the second station, after receiving the acknowledgment frame, the second station cannot determine which first data packet is successfully received. Therefore, the data packet acknowledgment method is inaccurate, and there is a problem of confusion in acknowledgment.

SUMMARY

Embodiments provide a data packet acknowledgment method, apparatus, and device, and a computer-readable storage medium, to overcome a problem, in the related art, of confusion in acknowledgment information of a plurality of data packets.

According to a first aspect, the embodiments provide a data packet acknowledgment method. The method includes:

A first station receives at least one first data packet in a plurality of data packets sent by a second station on a plurality of spectrum resources, where the plurality of data packets include the at least one first data packet, each of the plurality of data packets or the at least one first data packet carries multi-service indication information, and the multi-service indication information is used to indicate whether there is a data packet that is in the plurality of data packets and whose service type is the same as that of the first data packet; and replies acknowledgment information of the at least one first data packet to the second station based on the multi-service indication information.

For the plurality of data packets sent by the second station on the plurality of spectrum resources, after receiving the at least one first data packet in the plurality of data packets, the first station replies the acknowledgment information of the at least one first data packet to the second station based on the multi-service indication information carried in the at least one first data packet, to avoid a problem of confusion in acknowledgment information of the plurality of data packets.

With reference to the first aspect, in a first implementation of the first aspect, the first station may determine, based on the multi-service indication information, a type of an acknowledgment frame that carries the acknowledgment information of the at least one first data packet. If the multi-service indication information indicates that there is a data packet that is in the plurality of data packets and whose service type is the same as that of the first data packet, the first station sends a block acknowledgment frame to the second station, where the block acknowledgment frame includes the acknowledgment information of the first data packet; or if the multi-service indication information indicates that there is no data packet that is in the plurality of data packets and whose service type is the same as that of the first data packet, the first station sends an acknowledgment frame to the second station, where the acknowledgment frame is an acknowledgment of the first data packet.

With reference to the first implementation of the first aspect, in a second implementation of the first aspect, the block acknowledgment frame is an independent block acknowledgment frame, or the block acknowledgment frame is a block acknowledgment subframe in a multi-station acknowledgment frame.

With reference to the first implementation of the first aspect, in a third implementation of the first aspect, the acknowledgment frame is an acknowledgment subframe in a multi-station acknowledgment frame.

With reference to any one of the first aspect, or the first to the third implementations of the first aspect, in a fourth implementation of the first aspect, the first data packet is a single one media access control protocol data unit (MPDU), and the single one MPDU is one of a single MPDU (S-MPDU), an end of frame MPDU (EOF MPDU), and an acknowledgment enabled aggregate MPDU (Ack enabled A-MPDU).

With reference to any one of the first aspect, or the first to the fourth implementations of the first aspect, in a fifth implementation of the first aspect, the plurality of spectrum resources are a plurality of channels or a plurality of resource units that belong to a same frequency band, or the plurality of spectrum resources are a plurality of channels or a plurality of resource units that belong to different frequency bands.

According to a second aspect, the embodiments provide a data packet acknowledgment method. The method includes: A second station sends a plurality of data packets to a first station on a plurality of spectrum resources, where the plurality of data packets include at least one first data packet, each of the plurality of data packets or the at least one first data packet carries multi-service indication information, and the multi-service indication information is used to indicate whether there is a data packet that is in the plurality of data packets and whose service type is the same as that of the first data packet; and receives acknowledgment information of the at least one first data packet replied by the first station.

With reference to the second aspect, in a first implementation of the second aspect, the second station determines, based on the multi-service indication information, a type of an acknowledgment frame that carries the acknowledgment information of the first data packet, and obtains, based on the type of the acknowledgment frame, the acknowledgment information corresponding to the first data packet. If the multi-service indication information indicates that there is a data packet that is in the plurality of data packets and whose service type is the same as that of the first data packet, the second station receives a block acknowledgment frame replied by the first station, where the block acknowledgment frame includes the acknowledgment information of the first data packet; or if the multi-service indication information indicates that there is no data packet that is in the plurality of data packets and whose service type is the same as that of the first data packet, the second station receives an acknowledgment frame replied by the first station, where the acknowledgment frame is an acknowledgment of the first data packet.

With reference to the first implementation of the second aspect, in a second implementation of the second aspect, the block acknowledgment frame is an independent block acknowledgment frame, or the block acknowledgment frame is a block acknowledgment subframe in a multi-station acknowledgment frame.

With reference to the first implementation of the second aspect, in a third implementation of the second aspect, the acknowledgment frame is an acknowledgment subframe in a multi-station acknowledgment frame.

With reference to any one of the second aspect, or the first to the third implementations of the second aspect, in a fourth implementation of the second aspect, the first data packet is a single one MPDU, and the single one MPDU is one of an S-MPDU, an EOF MPDU, and an Ack enabled A-MPDU.

With reference to any one of the second aspect, or the first to the fourth implementations of the second aspect, in a fifth implementation of the second aspect, the plurality of spectrum resources are a plurality of channels or a plurality of resource units that belong to a same frequency band, or the plurality of spectrum resources are a plurality of channels or a plurality of resource units that belong to different frequency bands.

According to a third aspect, the embodiments provide a data packet acknowledgment apparatus. The apparatus includes modules configured to perform any one of the first aspect or the possible implementations of the first aspect.

According to a fourth aspect, the embodiments provide a data packet acknowledgment apparatus. The apparatus includes modules configured to perform any one of the second aspect or the possible implementations of the second aspect.

According to a fifth aspect, a data packet acknowledgment apparatus is provided. The apparatus includes a processor and a transceiver, and the processor controls the transceiver to perform any one of the first aspect or the possible implementations of the first aspect.

According to a sixth aspect, a data packet acknowledgment device is provided. The apparatus includes a processor and a transceiver, and the processor controls the transceiver to perform any one of the second aspect or the possible implementations of the second aspect.

According to a seventh aspect, a computer-readable storage medium is provided. The computer-readable storage medium is configured to store a computer program. The computer program includes an instruction used to perform the method according to any one of the first aspect or the possible implementations of the first aspect.

According to an eighth aspect, a computer-readable storage medium is provided. The computer-readable storage medium is configured to store a computer program. The computer program includes an instruction used to perform the method according to any one of the second aspect or the possible implementations of the second aspect.

According to a ninth aspect, a computer program product that includes an instruction is provided. When the computer program product runs on a computer, the computer is enabled to perform the method according to any one of the first aspect or the possible implementations of the first aspect.

According to a tenth aspect, a computer program product that includes an instruction is provided. When the computer program product runs on a computer, the computer is enabled to execute an instruction of the method according to any one of the second aspect or the possible implementations of the second aspect.

According to an eleventh aspect, a data packet acknowledgment chip is provided. The chip includes a transceiver/transceiver pin and a processor, and optionally, further includes a memory. The transceiver/transceiver pin, the processor, and the memory communicate with each other through an internal connection path. The processor is configured to execute an instruction to control the transceiver/transceiver pin to send or receive a signal. The memory is configured to store the instruction. When the processor executes the instruction, the processor performs the method according to any one of the first aspect or the possible implementations of the first aspect.

According to a twelfth aspect, a data packet acknowledgment chip is provided. The chip includes a transceiver/transceiver pin and a processor, and optionally, further includes a memory. The transceiver/transceiver pin, the processor, and the memory communicate with each other through an internal connection path. The processor is configured to execute an instruction to control the transceiver/transceiver pin to send or receive a signal. The memory is configured to store the instruction. When the processor executes the instruction, the processor performs the method according to any one of the second aspect or the possible implementations of the second aspect.

The technical solutions provided in the embodiments include at least the following beneficial effects:

In the embodiments, the first station receives the at least one first data packet in the plurality of data packets sent by the second station on the plurality of spectrum resources, and replies the acknowledgment information of the at least one first data packet to the second station based on the multi-service indication information carried in the at least one first data packet, to avoid a problem of confusion in acknowledgment information of the plurality of data packets.

It should be understood that the foregoing general descriptions and the following detailed descriptions are merely examples and explanations, and are not limiting.

The technical solutions provided in the embodiments include at least the following beneficial effects:

In the embodiments, the first station receives the at least one first data packet in the plurality of data packets sent by the second station on the plurality of spectrum resources, and replying the acknowledgment information of the at least one first data packet to the second station based on the multi-service indication information carried in the at least one first data packet, to avoid the problem of confusion in acknowledgment information of the plurality of data packets.

It should be understood that the foregoing general descriptions and the following detailed descriptions are merely examples and explanations and are non-limiting.

DESCRIPTION OF EMBODIMENTS

Figure 1:
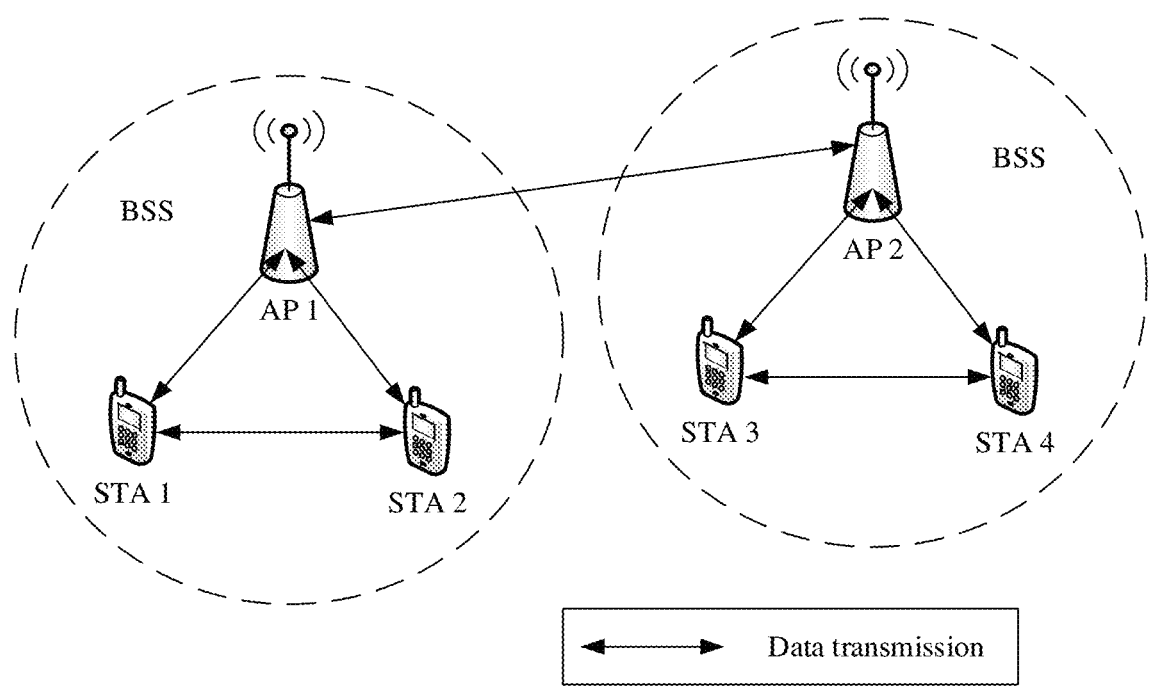
FIG. 1 is a system architectural diagram of a service transmission system according to an embodiment.

To make the objectives, technical solutions, and advantages of the embodiments clearer, the following further describes implementations in detail with reference to the accompanying drawings.

Before the embodiments are described in detail, an application scenario in the embodiments is first described.

Operating frequency bands supported by the IEEE 802.11ax standard are 2.4 GHz, 5 GHz, and 6 GHz frequency bands. IEEE 802.11 next-generation mainstream wireless fidelity (Wi-Fi) standard extremely high throughput (EHT) also supports the operating frequency bands of IEEE 802.11ax devices, for example, supports the 2.4 GHz, 5 GHz, and 6 GHz frequency bands. The 5 GHz and the 6 GHz frequency bands also support military radar and meteorological radar wireless systems. To coexist with the systems, a Wi-Fi EHT device may use dynamic frequency selection (DFS) to avoid using a same operating channel with wireless systems such as the military radar and meteorological radar wireless systems at the same time.

In addition to a continuous ultra-wide bandwidth of the 6 GHz frequency band, the Wi-Fi EHT standard may further use a multi-band aggregation technology to aggregate discontinuous frequency bands to constitute an ultra-wide bandwidth, and perform service transmission on the ultra-wide bandwidth, to further improve a service transmission rate.

Service transmission in the embodiments may be performed on one or more of the three frequency bands of 2.4 GHz, 5 GHz, and 6 GHz. For a Wi-Fi EHT device that supports the three frequency bands of 2.4 GHz, 5 GHz, and 6 GHz, service transmission may be performed on one primary frequency band and one or more secondary frequency bands, where the primary frequency band and the one or more secondary frequency bands are supported by the Wi-Fi EHT device. The primary frequency band and the secondary frequency band may each be one of the 2.4 GHz, 5 GHz, or 6 GHz frequency band. Channels are aggregated in the primary frequency band and the secondary frequency band to obtain a basic service set (BSS) bandwidth of 20 MHz, 40 MHz, 80 MHz, 160 MHz, or 320 MHz. The BSS bandwidth may be obtained by aggregating one or more channels in the primary frequency band and the secondary frequency band. The one or more channels in the primary frequency band may be a primary 20 MHz (P20) channel, a secondary 20 MHz (S20) channel, a secondary 40 MHz ( ) channel, a secondary 80 MHz (S80) channel, or a secondary 160 MHz (S160) channel, and the one or more channels in the secondary frequency band may be an S20, an S40, an S80, or an S160 channel.

As mentioned above, the BSS bandwidth is obtained by aggregating channels in the primary frequency band and the secondary frequency band, where the secondary frequency band may be one or more secondary frequency bands. Information about the BSS bandwidth, the primary frequency band, and the secondary frequency band need to be carried in a next-generation operation element or a field or an element of another management frame, for example, including a bandwidth field, a primary frequency band identifier (Band ID), and a plurality of secondary frequency band identifiers Band IDs, where the bandwidth field is used to indicate the BSS bandwidth, the primary frequency band identifier is used to indicate a primary frequency band identifier of the BSS bandwidth, and the secondary frequency band identifier is used to indicate a secondary frequency band identifier of the BSS bandwidth. A quantity of the secondary frequency band identifiers Band IDs is fixed, for example, at one or two. Alternatively, the quantity of secondary frequency band identifiers Band IDs may be variable and is indicated by using an additional field. When the BSS bandwidth is obtained by aggregating channels in the primary frequency band, the plurality of secondary frequency band IDs are set to a reserved value, for example 255. When the BSS bandwidth is obtained by aggregating a channel in the primary frequency band and a channel in one secondary frequency band, a remaining secondary frequency band ID is set to a reserved value, for example 255.

In addition, the primary frequency band identifier Band ID may be omitted. In this case, a frequency band identifier of a frequency band in which a beacon frame sent by an access point is located is the primary frequency band identifier Band ID.

For the primary frequency band and the secondary frequency band, bandwidth aggregation manners are different. In the primary frequency band, aggregation may be performed in the following manner 1; and in the secondary frequency band, aggregation may be performed in the following manner 2.

Manner 1: One or more channels of P20, S20, S40, S80, and 5160 are sequentially aggregated. In this aggregation manner, aggregation cannot be performed by skipping a channel in P20, S20, S40, S80, and 5160. For example, aggregation cannot be performed on P20, S20, and S80 by skipping S40. In this aggregation manner, repeated secondary channels (S20, S40, S80, and 5160) are not allowed to be aggregated. For example, P20, S20, S20, and S40 are not allowed to be aggregated.

Manner 2: One secondary channel of S20, S40, S80, and 5160 is selected for aggregation in the secondary frequency band.

Alternatively, one secondary channel of S20, S40, S80, and 5160 is selected for aggregation in the secondary frequency band, and the secondary channel is greater than or equal to a maximum secondary channel aggregated in the primary frequency band. For example, if P20, S20, and S40 are aggregated in the primary frequency band, only one secondary channel of S40, S80, and 5160 can be selected for aggregation in the secondary frequency band, or if S160 is selected for aggregation, an aggregated bandwidth of 80 MHz+160 MHz is constituted.

Alternatively, a bandwidth that is the same as a bandwidth aggregated in the primary frequency band is selected for aggregation in the secondary frequency band. For example, if P20, S20, and S40 are aggregated in the primary frequency band to obtain a bandwidth of 80 MHz, S80 is selected for aggregation in the secondary frequency band, to constitute an aggregated bandwidth of 80 MHz+80 MHz.

Alternatively, if a bandwidth that is greater than or equal to 80 MHz is aggregated in the primary frequency band, one of S80 and S160 is selected for aggregation in the secondary frequency band. Otherwise, aggregation cannot be performed in the secondary frequency band. For example, if a bandwidth of 160 MHz is aggregated in the primary frequency band, and S80 is selected for aggregation in the secondary frequency band, an aggregated bandwidth of 160 MHz+80 MHz is constituted.

In another possible implementation, when the station establishes a BSS on a plurality of frequency bands, aggregation is still performed on the plurality of frequency bands in a sequence of P20, S20, S40, S80, and 5160 according to an existing principle. For example, if the station already aggregates P20, S20, and S40 in a frequency band in which the primary 20 MHz is located, only S80 and S160 can be aggregated in sequence in a secondary frequency band, and one of S20 and S40 cannot be aggregated.

If there are a plurality of secondary frequency bands, aggregation may be performed in the secondary frequency bands in one of the following two implementations.

In a possible implementation, aggregation is performed in the primary frequency band according to the foregoing manner 1, and aggregation is performed in the plurality of secondary frequency bands according to the foregoing manner 2.

In another possible implementation, the plurality of secondary frequency bands are a secondary frequency band 1, a secondary frequency band 2, . . . , and a secondary frequency band n in sequence. The secondary frequency band 1 is aggregated according to the foregoing manner 2, and the secondary frequency band n is also aggregated according to the foregoing manner 2. However, a frequency band in which P20 is located needs to be replaced with the secondary frequency band n−1.

Optionally, an aggregated bandwidth generated through aggregation in one or more frequency bands may be one of the following: 20 MHz, 40 MHz, 80 MHz, 160 MHz, 240 MHz, 320 MHz, 80 MHz+80 MHz, 80 MHz+160 MHz, 160 MHz+80 MHz, 80 MHz+240 MHz, 160 MHz+160 MHz, 240 MHz+80 MHz, 80 MHz+80 MHz+80 MHz, 80 MHz+ 80 MHz+160 MHz, 160 MHz+80 MHz+80 MHz, and 80 MHz+80 MHz+80 MHz+80 MHz. A quantity of frequency segments is equal to a quantity of non-contiguous channels. For example, a quantity of frequency segments in the aggregated bandwidth 80 MHz+240 MHz is two, and the quantity needs to be indicated by using center frequencies of the two corresponding frequency segments. A protocol specifies a maximum quantity of frequency segment center frequency indication fields. If the maximum quantity of frequency segment center frequency indication fields is greater than the quantity of non-contiguous channels, a value of a remaining frequency segment center frequency indication field is set to be reserved. Alternatively, a quantity of frequency segment center frequency indication fields is indicated by using an additional field.

In addition, the first frequency segment of a non-contiguous aggregated bandwidth may be a frequency segment in which the primary 20 MHz is located or may be a lowest or highest frequency segment in terms of frequency. Aggregated bandwidths of 240 MHz and 320 MHz, either contiguous or non-contiguous, may be respectively indicated by three frequency segment center frequencies and four frequency segment center frequencies.

For a BSS supported by the IEEE 802.11ax standard, there may be one or more frequency bands supported by the BSS, and an aggregated bandwidth supported by the BSS may be generated in the foregoing aggregation manner. One BSS may include a plurality of stations, and the plurality of stations may include an access point (AP) station, which is an access point for short below, and a plurality of non-access-point stations (STA), which are stations for short below. Currently, a BSS bandwidth is generated by aggregating channels in a frequency band. Service transmission may occur not only between the stations included in the BSS but also between a plurality of BSSs. Therefore, the service transmission in the embodiments may occur between an AP and a STA, may occur between APs, or may occur between STAs.

FIG. 1 is an architectural diagram of a service transmission system according to an embodiment. The system includes at least a BSS 1 and a BSS 2, where the BSS 1 includes three stations: an AP 1, a STA 1, and a STA 2; and the BSS 1 includes three stations: an AP 2, a STA 3, and a STA 4. As shown in FIG. 1, service transmission may occur between the AP 1 and the AP 2, may occur between the AP 1 and the STA 1 or the STA 2, or may occur between the STA 1 and the STA 2. Service transmission between stations included in the BSS 2 is similar to service transmission between stations included in the BSS 1, and details are not described herein again.

The core apparatuses and products in the embodiments include, but are not limited to, an AP or a STA such as a communications server, a router, a switch, a bridge, a computer, or a mobile phone, for example an AP or a STA that supports the IEEE 802.11 standard, and may further be a related AP or STA that supports a cellular network. The following describes structures of an AP and a STA in the embodiments by using an AP and a STA that support the IEEE 802.11 standard as an example.

Figure 2:
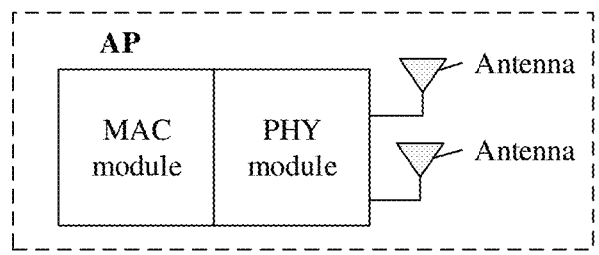
FIG. 2 is a structural diagram of an AP according to an embodiment.

FIG. 2 is a structural diagram of an AP according to an embodiment. The AP includes at least a media access control (MAC) module and a physical layer (PHY) module.

Figure 3:
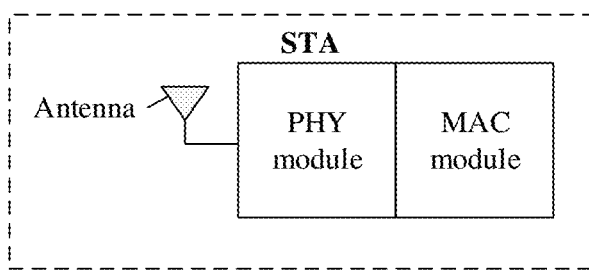
FIG. 3 is a structural diagram of a STA according to an embodiment.

FIG. 3 is a structural diagram of a STA according to an embodiment. The STA includes at least a MAC module and a PHY module.

The MAC module in FIG. 2 and FIG. 3 is configured to process data and information according to a MAC layer protocol and transfer processed data and information to the PHY module or an upper-layer module. The PHY module is configured to process, according to a PHY layer protocol, data received by using a radio module or the data and information transmitted by the MAC module, and transmit processed data and information to the MAC module or send processed data and information by using the radio module.

It can be noted that FIG. 2 shows only an example of an AP that has two antennas, and FIG. 3 shows only an example of a STA that has one antenna. A quantity of antennas of the AP and a quantity of antennas of the STA are not limited.

Figure 4:
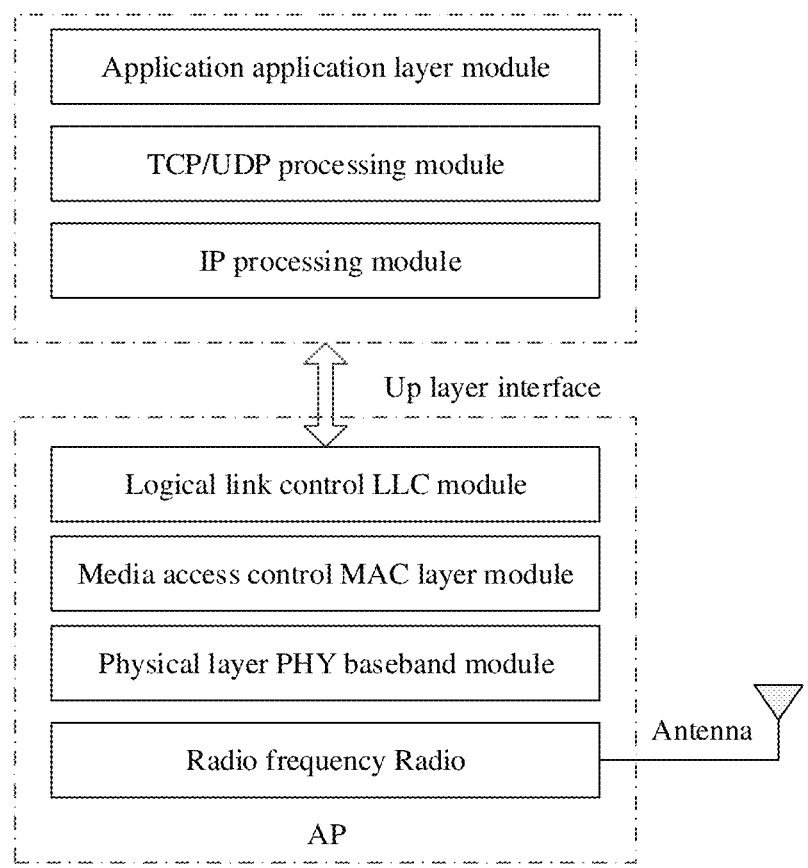
FIG. 4 is a schematic diagram of an internal structure of an AP according to an embodiment.
Figure 5:
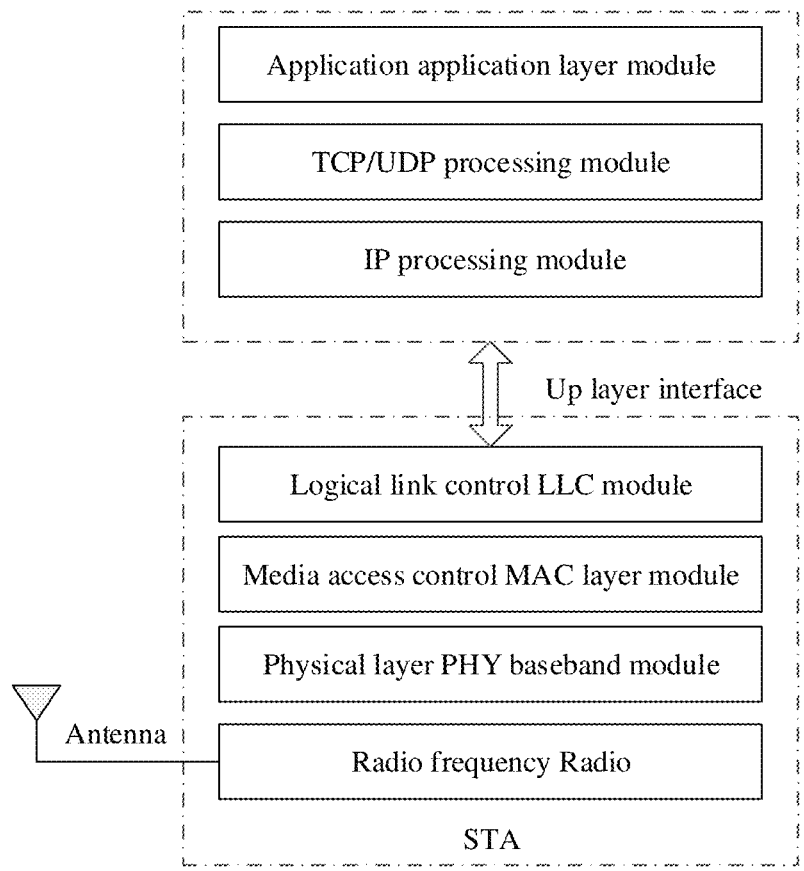
FIG. 5 is a schematic diagram of an internal structure of a STA according to an embodiment.

Further, FIG. 4 and FIG. 5 are respectively more detailed schematic structural diagrams of an AP and a STA. FIG. 4 is a schematic diagram of an internal structure of an AP according to an embodiment. As shown in FIG. 4, the AP includes an application layer module, a transmission control protocol and user datagram protocol (TCP/UDP) processing module, an IP processing module, a logical link control (LLC) module, a media access control MAC layer module, a physical layer PHY baseband module, and a radio module.

FIG. 5 is a schematic diagram of an internal structure of a STA according to an embodiment. As shown in FIG. 5, the STA includes an application layer module, a TCP/UDP processing module, an IP processing module, a logical link control LLC module, a media access control MAC layer module, a physical layer PHY baseband module, and a radio frequency radio.

Figure 6:
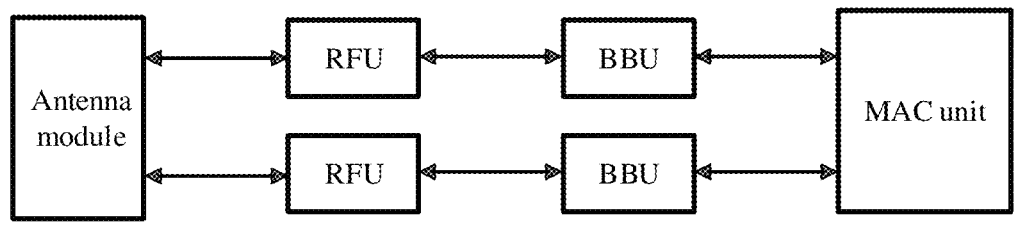
FIG. 6 is a schematic diagram of a hardware architecture of a station that supports a plurality of frequency bands according to an embodiment.

FIG. 6 is a schematic diagram of a hardware architecture of a station that supports a plurality of frequency bands and that is based on a Wi-Fi technology according to an embodiment. The station may be an AP or a STA. The station supports sending or receiving, on a plurality of frequency bands, a plurality of data packets that belong to a same service or different services. The station includes at least a MAC unit, a baseband unit (BBU), a radio frequency unit (Radio Frequency Unit, RFU), and an antenna module. Service transmission on each frequency band is performed by using a BBU and an RFU that are dedicated to the frequency band, and service transmission on the plurality of frequency bands may share the MAC unit and the antenna module.

In another possible implementation of the station that supports a plurality of frequency bands, the station includes at least an up MAC layer, an MSDU parser, an MSDU reverse parser, a MAC control unit (MCU), and a radio frequency unit and a baseband processing unit (RFU/BBU).

Service transmission on the plurality of frequency bands may share the up MAC layer, the MSDU parser, and the MSDU reverse parser. When the station sends a plurality of data packets of a service, the up MAC layer receives MAC service data units (MAC service data unit, MSDU) that are processed by a layer higher than the MAC layer, an MSDU parser allocates the MSDUs to the plurality of frequency bands supported by the station, and an MCU unit dedicated to each frequency band adds MAC header information to the MSDUs, encapsulates the MSDUs into MPDUs, and performs baseband and radio frequency processing by using an RFU/BBU unit dedicated to each frequency band. When the station receives a plurality of data packets of a service, RFU/BBU units of the plurality of frequency bands receive a plurality of MPDUs, and respectively transmit the plurality of MPDUs to an MCU dedicated to each frequency band, to remove MAC header information and perform decapsulation processing. An MSDU reverse parser processes the received MPDUs of the plurality of frequency bands to obtain MSDUs, and sends the MSDUs to the up MAC layer.

Figure 7:
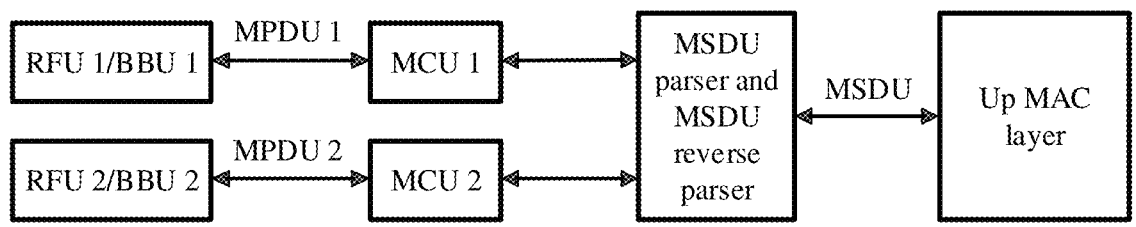
FIG. 7 is a schematic diagram of a hardware architecture of a station that supports two frequency bands according to an embodiment.

FIG. 7 is a schematic diagram of a hardware architecture of a station that supports two frequency bands. The station includes at least an up MAC layer, an MSDU parser, and an MSDU reverse parser that are shared by the two frequency bands, and further includes an MCU 1 and an RFU 1/BBU 1 of a first frequency band supported by the station, and an MCU 2 and an RFU 2/BBU 2 of a second frequency band supported by the station. For example, the up MAC layer receives MSDUs processed by a layer higher than the MAC layer. An MSDU parser allocates the MSDUs to the two frequency bands supported by the station. The MCU 1 adds MAC header information to an MSDU allocated to the first frequency band and encapsulates the MSDU into an MPDU 1. The RFU 1/BBU 1 performs baseband and radio frequency processing on the MPDU 1 and sends the MPDU 1 by using an antenna module that is not shown in FIG. 7. The MCU 2 adds MAC header information to an MSDU allocated to the second frequency band and encapsulates the MSDU into an MPDU 2. The RFU 2/BBU 2 performs baseband and radio frequency processing on the MPDU 2 and sends the MPDU 2 by using the antenna module that is not shown in FIG. 7.

The following describes a data packet and a frame structure for transmitting the data packet in this embodiment.

The plurality of data packets in service transmission in this embodiment may belong to a same service or may belong to different services. The data packet is in a form of the MPDU at the MAC layer. After information such as a MAC delimiter and MAC padding is added to one or more MPDUs, a presentation service data unit (PSDU) is obtained. After information such as a physical layer convergence procedure (PLCP) sublayer header and preamble information is added to the PSDU, a physical layer protocol data unit (PPDU) is obtained. The PPDU is mapped to a PPDU and is transmitted in a form of a single PPDU.

A plurality of MPDUs corresponding to the plurality of data packets may constitute an aggregate MPDU (A-MPDU), where each MPDU and an MPDU delimiter before the MPDU are in a form of a subframe of the A-MPDU. The A-MPDU is mapped to a PPDU, shares information such as the PLCP header, and is transmitted in a form of a single PPDU.

The plurality of MPDUs corresponding to the plurality of data packets may further constitute a multiple traffic identifier A-MPDU (Multi-TID A-MPDU), where each MPDU and an MPDU delimiter before the MPDU are in a form of a subframe of the multi-service A-MPDU. The plurality of data packets may belong to different traffic identifier (TID). The Multi-TID A-MPDU is mapped to a PPDU, shares information such as the PLCP header, and is transmitted in a form of a single PPDU.

An MPDU corresponding to a data packet may further be mapped to a PPDU, is transmitted in a form of a single PPDU, and is referred to as a single one MPDU below. The single one MPDU may be an S-MPDU in the 802.11ac/802.11ax protocol, an end of frame MPDU (EOF MPDU) or an Ack enabled A-MPDU that is in the 802.11ax protocol. The S-MPDU is a special aggregate MPDU. The S-MPDU includes only one A-MPDU subframe whose MPDU length is not 0, a length of the A-MPDU subframe is not 0, and a value of an EOF field of an MPDU delimiter in the A-MPDU subframe is 1. The Ack-enabled A-MPDU includes at least two A-MPDU subframes whose lengths are not 0, an ACK needs to be replied for an A-MPDU subframe, a value of an EOF field of an MPDU delimiter in the A-MPDU subframe is set to 1, and an ACK does not need to be replied for a remaining A-MPDU subframe. The EOF MPDU is included in an A-MPDU subframe, and a value of an EOF field of an MPDU delimiter in the A-MPDU subframe is 1, but a length field is not 0.

A frame structure of a PPDU in an IEEE 802.11a standard starts with a legacy preamble, and includes a legacy-short training field (L-STF), a legacy-long training field (L-LTF), and a legacy-signal field (L-SIG). To be compatible with a legacy station, frame structures in IEEE 802.11g, IEEE 802.11n, IEEE 802.11ac, and IEEE 802.11ax all start with a legacy preamble, and a next-generation preamble follows the legacy preamble. The next-generation preamble includes new function indication information, for example, bandwidth indication information, of each generation of Wi-Fi. In addition, the next-generation preamble may further carry information that indicates whether the PPDU is a next-generation PPDU rather than a PPDU in 802.11a, for example, indicates that the PPDU is a high throughput PPDU (HT PPDU) in IEEE 802.11n, a very high throughput PPDU (VHT PPDU) in IEEE 802.11ac, or a high efficiency PPDU (HE PPDU) in IEEE 802.11ax.

For a station in this embodiment, when receiving an MPDU, the station needs to reply a piece of acknowledgment information. The acknowledgment information may be carried in an ACK frame in the 802.11n/802.11ac/802.11ax protocol. The ACK frame is used to acknowledge a received single one MPDU sent by a station and includes address information of a receiving station of the acknowledgment information. The acknowledgment information may further be carried in a block acknowledgment frame (Block ACK frame) in the 802.11n/802.11ac/802.11ax protocol. The Block ACK frame is used to acknowledge a plurality of received MPDUs that belong to a same service type and that are sent by a station, and includes address information of a receiving station, a service type to which the plurality of MPDUs belong, a start identifier of the plurality of MPDUs, and a bitmap used to indicate whether the plurality of MPDUs are correctly received. The acknowledgment information may further be carried in a multi-station acknowledgment frame in the 802.11ax protocol. The multi-station acknowledgment frame is used to acknowledge a plurality of received data packets sent by a plurality of stations or is used to aggregate received data packets that belong to different service types and that are sent by a station. The multi-station acknowledgment frame includes at least one acknowledgment subframe or block acknowledgment subframe. An acknowledgment subframe is acknowledgment information of a single one MPDU sent by a station and includes identification information of the station and a service identifier of the data packet. A block acknowledgment subframe is acknowledgment information of a plurality of data packets from a station, and valid information carried in the block acknowledgment subframe is the same as valid information carried in the block acknowledgment frame. The multi-station acknowledgment frame may be received by the plurality of stations that send the data packets. Each of the plurality of stations obtains, from the multi-station acknowledgment frame, an acknowledgment subframe or a block acknowledgment subframe corresponding to the station, and obtains, from the multi-station acknowledgment frame, acknowledgment information of a data packet sent by the station to a first station.

The following is an example of service transmission and replyingacknowledgment information: a station 1 simultaneously sends different data packets to a station 2 in a single-user transmission manner or a multi-user transmission manner. After receiving the different data packets sent by the station 1 on a single frequency band, the station 2 repliesacknowledgment information after a short inter-frame space (SIFS). The data packet sent by the station 1 to the station 2 may be a single one MPDU, an A-MPDU, or a Multi-TID A-MPDU. The single one MPDU triggers a receive end to respond with the acknowledgment frame. The acknowledgment frame may be an independent acknowledgment frame Ack, or may be an acknowledgment frame Ack subframe included in a Multi-STA Block. The A-MPDU (excluding an S-MPDU and an Ack-enabled A-MPDU) triggers the receive end to respond with the block acknowledgment frame. The Multi-TID A-MPDU triggers the receive end to respond to the multi-station acknowledgment frame. The Ack subframe in the Multi-STA Block Ack needs to be replied for the EOF MPDU in the Multi-TID A-MPDU, and a Block Ack subframe in the Multi-STA Block Ack needs to be replied for a non-EOF MPDU in the Multi-TID A-MPDU.

In the embodiments, a method, an apparatus, and a device for sending, by a second station, a data packet; and receiving, by a first station, the data packet sent by the second station, and replying acknowledgment information are used as an example. The following describes the method provided in the embodiments.

Figure 8:
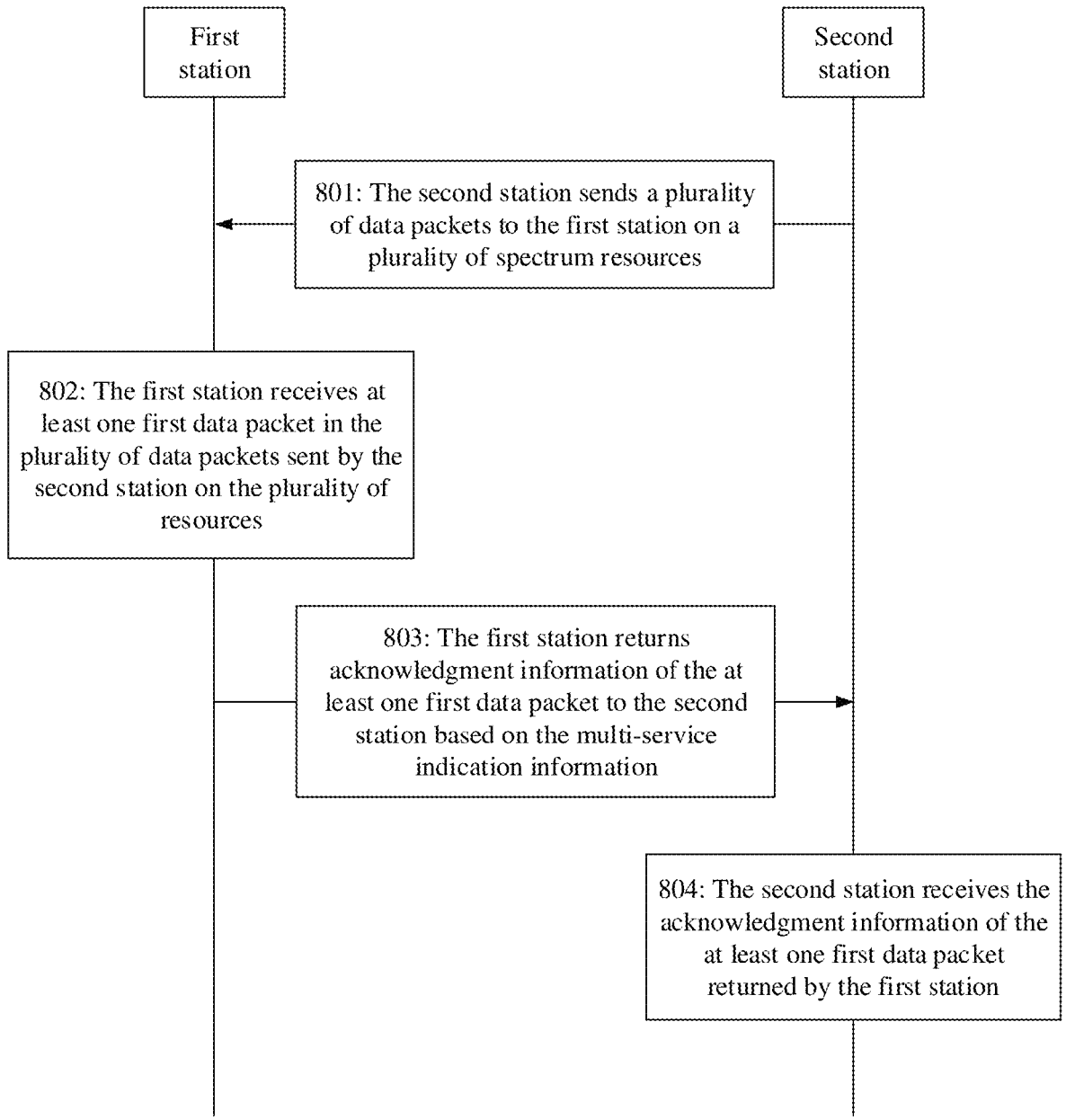
FIG. 8 is a flowchart of a data packet acknowledgment method according to an embodiment.

FIG. 8 is a flowchart of a data packet acknowledgment method according to an embodiment. The method includes the following steps.

Step 801: A second station sends a plurality of data packets to a first station on a plurality of spectrum resources.

The plurality of data packets include at least one first data packet, each of the plurality of data packets or the at least one first data packet carries multi-service indication information, and the multi-service indication information is used to indicate whether there is a data packet (other than the first data packet) that is in the plurality of data packets and whose service type is the same as that of the first data packet.

Optionally, the plurality of data packets may be a single one MPDU or may be a block acknowledgment enabled A-MPDU, or a multi-station acknowledgment enabled Multi-TID A-MPDU.

The block acknowledgment enabled A-MPDU refers to that a data packet in the A-MPDU triggers a Block Ack subframe in a Block ACK frame or a multi-station acknowledgment frame to perform acknowledgment. The multi-station acknowledgment enabled Multi-TID A-MPDU refers to that a data packet in the Multi-TID A-MPDU triggers a multi-station acknowledgment frame to perform acknowledgment.

It can be noted that the plurality of data packets include at most one MPDU encapsulated by the MMPDU. Otherwise, the receive end cannot acknowledge a plurality of MMPDUs that are received at a time.

For the plurality of data packets, the plurality of data packets include the at least one first data packet. The first data packet is a single one MPDU, and the single one MPDU may be one of an S-MPDU, an Ack-enabled MPDU, and an EOF MPDU.

For example, the plurality of data packets include M data packets that belong to a same service, or the plurality of data packets include N data packets that belong to different services. Alternatively, the plurality of data packets include M data packets that belong to a same service and N data packets that belong to different services. M and N are positive integers.

The multi-service indication information being a first preset value indicates that there is a data packet (other than the first data packet) that is in the plurality of data packets and whose service type is the same as that of the first data packet, and the multi-service indication information being a second preset value indicates that there is no data packet that is in the plurality of data packets and whose service type is the same as that of the first data packet. For example, the first preset value is 1, and the second preset value is 0. In another example, the first preset value is 0, and the second preset value is 1. A value of the multi-service indication information is not limited in this embodiment, provided that it can be determined whether there are data packets whose service types are the same.

Optionally, if the first data packet is an MPDU and is transmitted in a single-user transmission manner, the multi-service indication information is carried in a next-generation preamble field in a physical layer preamble of a PPDU corresponding to the first data packet. Alternatively, the multi-service indication information is carried in a MAC header of the first data packet. If the first data packet is an MPDU and is transmitted in a multi-user transmission manner, the multi-service indication information is carried in a station information field in a next-generation preamble field in a physical layer preamble of a PPDU corresponding to the first data packet, for example, a station information field in a high efficient signal field B (HE-SIG B) in a multi-user PPDU. Alternatively, the multi-service indication information is carried in a MAC header of the first data packet.

In a possible implementation, to enable the first station to determine that the second station sends the plurality of data packets on the plurality of spectrum resources, the method provided in this embodiment includes, but is not limited to, either of the following two manners.

Manner 1: Each of the plurality of data packets or the at least one first data packet further carries multi-band indication information.

The multi-band indication information is used to indicate whether the second station sends the data packets to the first station by using the plurality of spectrum resources. For example, if a value of the multi-band indication information is a third preset value, it is indicated that the second station sends the data packets to the first station by using the plurality of spectrum resources, and if the value of the multi-band indication information is a fourth preset value, it is indicated that the second station sends the data packets to the first station by using a single spectrum resource. For example, the third preset value is 1, and the fourth preset value is 0. In another example, the third preset value is 0, and the fourth preset value is 1.

Optionally, the multi-band indication information is carried in the next-generation preamble field in the physical layer preamble of the PPDU corresponding to the first data packet. Alternatively, the multi-band indication information is carried in the MAC header of the first data packet.

Optionally, the multi-band indication information and the multi-service indication information may be carried in one information field. For example, the multi-band indication information and the multi-service indication information are jointly encoded and are indicated in one field. The field may be located in the next-generation preamble field in the physical layer preamble of the PPDU corresponding to the first data packet. Alternatively, the multi-band indication information is carried in the MAC header of the first data packet.

Manner 2: The first station and the second station pre-agree that the plurality of data packets are sent on the plurality of spectrum resources, for example, by using a beacon frame for indication.

In this manner, the at least one first data packet does not need to carry the multi-band indication information. Because it is a pre-agreement, the first station can determine, without using additional information for indication, that the second station sends the data packet on the plurality of spectrum resources.

Further, regardless of which of the foregoing manners is used to enable the first station to determine that the second station sends the plurality of data packets on the plurality of spectrum resources, for the first station and the second station, the first station and the second station may be stations that belong to a same BSS. For example, the first station may be an AP or a STA, and the second station may be an AP or a STA.

In addition, the plurality of spectrum resources for sending the plurality of data packets belong to a same frequency band or different frequency bands. Further, the frequency band is one or more of primary frequency bands and secondary frequency bands that are supported by the first station and the second station. For example, the primary frequency band supported by the first station and the second station is 2.4 GHz, and two secondary frequency bands are 5 GHz and 6 GHz. The plurality of spectrum resources are located on the 2.4 GHz primary frequency band and the 5 GHz secondary frequency band, or the plurality of spectrum resources are all located on the 2.4 GHz primary frequency band.

Optionally, the plurality of spectrum resources may belong to different channels. Further, the channel is a channel in a frequency band supported by the first station and the second station. If the plurality of spectrum resources belong to the different channels, the different channels may be located on the same frequency band or the different frequency bands. For example, the primary frequency band supported by the first station and the second station is 2.4 GHz, and two secondary frequency bands supported by the first station and the second station are 5 GHz and 6 GHz. An aggregated bandwidth supported by the first station and the second station is 80 MHz+80 MHz+160 MHz. The plurality of spectrum resources belong to a channel of 80 MHz on the 2.4 GHz primary frequency band and a channel of 80 MHz on the 5 GHz secondary frequency band.

Optionally, the plurality of spectrum resources may belong to different resource units (RU). Further, the resource units may be located on a same frequency band or different frequency bands, or the resource units may be located on a same channel or different channels.

Optionally, the plurality of spectrum resources are a plurality of channels or a plurality of resource units that belong to a same frequency band, or the plurality of spectrum resources are a plurality of channels or a plurality of resource units that belong to different frequency bands.

Regardless of which of the foregoing types of the plurality of spectrum resources is used, the plurality of data packets are sent by the second station to the first station respectively on different spectrum resources at a same moment. Alternatively, the plurality of data packets are sent by the second station to the first station on different spectrum resources on a same frequency band at different moments. Alternatively, the plurality of data packets are sent by the second station to the first station on different spectrum resources on different frequency bands at different moments.

Step 802: The first station receives the at least one first data packet in the plurality of data packets sent by the second station on the plurality of spectrum resources.

For example, the second station sends a first MPDU to the first station by using a first spectrum resource, and at the same time, the second station sends a second MPDU to the first station by using a second spectrum resource. The first MPDU and the second MPDU are two data packets that belong to a same service, and step 802 includes the following:

The first station receives at least the first MPDU, where the first MPDU is sent by the second station to the first station by using the first spectrum resource in the plurality of spectrum resources, the first MPDU includes the multi-service indication information, and the value of the multi-service indication information is the first preset value, which indicates that there is a data packet that is in the plurality of data packets sent by the second station to the first station and whose service type is the same as that of the first MPDU.

Optionally, if the first station further receives a second MPDU, the second MPDU includes the multi-service indication information, and the value of the multi-service indication information is the first preset value, which indicates that there is a data packet that is in the plurality of data packets sent by the second station to the first station and whose service type is the same as that of the second MPDU.

Further, when the foregoing manner 1 is used to enable the first station to determine that the second station sends the plurality of data packets on the plurality of spectrum resources, the first MPDU further includes the multi-band indication information, and the value of the multi-band indication information is the third preset value, which indicates that the first MPDU and the second MPDU are sent by using the plurality of spectrum resources. In addition, if the second MPDU is further received, the second MPDU may further include the multi-band indication information, and the value of the multi-band indication information is the third preset value, which indicates that the first MPDU and the second MPDU are sent by using the plurality of spectrum resources.

For another example, if the first MPDU and the second MPDU are data packets that are sent by the second station to the first station and that belong to different services, values of the multi-service indication information included in the first MPDU and the second MPDU are both the second preset value.

It may be understood that, if the foregoing manner 2 of pre-agreement is used to enable the first station to determine that the second station sends the plurality of data packets on the plurality of spectrum resources, the first MPDU and the second MPDU do not need to include the multi-band indication information.

Step 803: The first station replies acknowledgment information of the at least one first data packet to the second station based on the multi-service indication information.

Optionally, the second station performs step 803 after a short inter-frame space after receiving the at least one first data packet in the plurality of data packets sent by the first station by using the plurality of spectrum resources.

In a possible implementation, step 803 includes:

If the multi-service indication information indicates that there is a data packet that is in the plurality of data packets and whose service type is the same as that of the first data packet, the first station sends a block acknowledgment frame to the second station; or if the multi-service indication information indicates that there is no data packet that is in the plurality of data packets and whose service type is the same as that of the first data packet, the first station sends an acknowledgment frame to the second station.

The block acknowledgment frame includes acknowledgment information of the first data packet, and the acknowledgment frame is an acknowledgment of the first data packet.

Optionally, the acknowledgment frame further includes an address of the receive end, the block acknowledgment frame includes the address of the receive end, and in this embodiment, the address of the receive end is an address of the second station. Optionally, the block acknowledgment frame further includes an identifier of the first data packet, and the identifier of the first data packet included in the block acknowledgment frame is used to indicate that the acknowledgment information included in the block acknowledgment frame corresponds to the first data packet.

In an optional implementation, the block acknowledgment frame is an independent block acknowledgment frame. Alternatively, the block acknowledgment frame is a block acknowledgment subframe in a multi-station acknowledgment frame (Multi-STA Block ACK frame). Alternatively, the block acknowledgment frame is a compressed block acknowledgment frame (Compressed Block Ack frame). Optionally, the acknowledgment frame is an acknowledgment subframe in the multi-station acknowledgment frame.

Further, in this implementation, in addition to the first data packet that is sent by the second station and received by the first station, if the second station further sends a second data packet to the first station, and the first station fails to receive the second data packet, the first station still determines, based on the multi-service indication information included in the first data packet, that the first data packet is one of data packets that are sent by the second station and received by the first station and that belong to a same service or different services. That is, regardless of whether the first station receives the second data packet or not, the first station performs the foregoing determining based on the multi-service indication information included in the first data packet, without considering the second data packet.

Step 804: The second station receives the acknowledgment information of the at least one first data packet replied by the first station.

In a possible implementation, step 804 includes: if the multi-service indication information indicates that there is a data packet that is in the plurality of data packets and whose service type is the same as that of the first data packet, the second station receives the block acknowledgment frame replied by the first station; or if the multi-service indication information indicates that there is no data packet that is in the plurality of data packets and whose service type is the same as that of the first data packet, the second station receives the acknowledgment frame replied by the first station.

The block acknowledgment frame includes acknowledgment information of the first data packet, and the acknowledgment frame is an acknowledgment of the first data packet.

In another possible implementation, the first station determines, with reference to TID subfields of an MPDU delimiter field and an MPDU quality of service control (QoS Control) field, whether the first data packet is a single MPDU, an A-MPDU (excluding an S-MPDU), or a Multi-TID A-MPDU. If the first data packet is the single MPDU, the first station sends the acknowledgment frame to the second station; or if the first data packet is the A-MPDU (except an Ack-enabled A-MPDU) or the Multi-TID A-MPDU (except an aggregated EOF MPDU), the first station sends the block acknowledgment frame to the second station.

In still another possible implementation, each of the plurality of data packets or the at least one first data packet does not need to carry the multi-band indication information. If the first station receives the data packets sent by the second station only on P20 in the primary frequency band:

If the first station receives, only on the P20 channel in the primary frequency band, the single MPDU sent by the second station, and does not receive a data packet on another frequency band, the first station sends the acknowledgment frame to the second station, where the acknowledgment frame is an acknowledgment corresponding to the single MPDU, and the acknowledgment frame is an independent acknowledgment frame Ack.

If the first station receives, only on the P20 channel in the primary frequency band, the A-MPDU sent by the second station, and does not receive a data packet on another frequency band, the first station sends the block acknowledgment frame to the second station, where the block acknowledgment frame carries acknowledgment information corresponding to the A-MPDU.

If the first station receives, only on the P20 channel in the primary frequency band, the multi-service A-MPDU (Multi-TID A-MPDU) sent by the second station, and does not receive a data packet on another frequency band, the first station sends the multi-station acknowledgment frame to the second station, where the multi-station acknowledgment frame carries acknowledgment information corresponding to the Multi-TID A-MPDU.

In this embodiment, the first station receives the at least one first data packet in the plurality of data packets sent by the second station on the plurality of spectrum resources, and replies the acknowledgment information of the at least one first data packet to the second station based on the multi-service indication information carried in the at least one first data packet, to avoid a problem of confusion in acknowledgment information of the plurality of data packets.

In the foregoing embodiment, the second station sends the plurality of data packets on the plurality of spectrum resources simultaneously. In another scenario, the second station may send the plurality of data packets on the plurality of spectrum resources in a staggered manner.

A scenario in which the method in the foregoing embodiment is used includes, but is not limited to: after receiving the plurality of data packets sent by the second station on the plurality of spectrum resources, the first station replies duplicate acknowledgment information, for example, non-high efficiency duplicate acknowledgment information Non-HT duplicate acknowledgment frame information, on each 20 MHz channel, or replies one acknowledgment frame on a plurality of channels.

In another possible implementation, after receiving the plurality of data packets sent by the second station on the plurality of spectrum resources, the first station is allowed to reply acknowledgment information on different frequency bands, for example, for a data packet received in the primary frequency band, reply, according to an existing 802.11 acknowledgment method, duplicate acknowledgment information, for example, non-high throughput duplicate (Non-HT duplicate) acknowledgment frame, on a plurality of 20 MHz channels in the primary frequency band; and, for a data packet received in the secondary frequency band, reply, according to the existing 802.11 acknowledgment method, another piece of duplicate acknowledgment information, for example, non-high efficiency duplicate Non-HT duplicate acknowledgment frame, on a plurality of 20 MHz channels in the secondary frequency band. Different pieces of duplicate acknowledgment information are allowed on the plurality of frequency bands, but pieces of duplicate acknowledgment information, for example, non-efficient copy Non-HT duplicate acknowledgment frame, on a same frequency band are the same. In this way, the data packet does not carry the multi-service indication information or the multi-band indication information, and a problem of confusion in acknowledgment can also be avoided.

Figure 9:
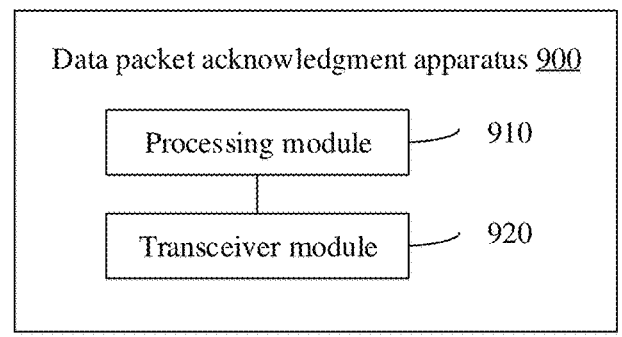
FIG. 9 is a structural block diagram of a data packet acknowledgment apparatus according to an embodiment.

Based on the foregoing method embodiments, FIG. 9 is a block diagram of a data packet acknowledgment apparatus 900 according to an embodiment. The data packet acknowledgment apparatus 900 includes a processing module 910 and a transceiver module 920.

The processing module 910 is configured to control the transceiver module 920 to receive the at least one first data packet in the plurality of data packets sent by the second station on the plurality of spectrum resources.

The plurality of data packets include the at least one first data packet, each of the plurality of data packets or the at least one first data packet carries the multi-service indication information, and the multi-service indication information is used to indicate whether there is a data packet that is in the plurality of data packets and whose service type is the same as that of the first data packet.

Optionally, the plurality of data packets may be a single one MPDU, or may be a block acknowledgment enabled A-MPDU, or a multi-station acknowledgment enabled Multi-TID A-MPDU.

Optionally, the plurality of data packets include at most one MPDU encapsulated by the MMPDU.

Optionally, the first data packet is a single one MPDU, and the single one MPDU may be one of an S-MPDU, an Ack-enabled MPDU, and an EOF MPDU.

Optionally, the plurality of spectrum resources are a plurality of channels or a plurality of resource units that belong to a same frequency band, or the plurality of spectrum resources are a plurality of channels or a plurality of resource units that belong to different frequency bands.

The processing module 910 is further configured to control the transceiver module 920 to reply the acknowledgment information of the at least one first data packet to the second station based on the multi-service indication information.

In a possible implementation, the processing module 910 is configured to:

if the multi-service indication information indicates that there is a data packet that is in the plurality of data packets and whose service type is the same as that of the first data packet, control the transceiver module 920 to send a block acknowledgment frame to the second station; or if the multi-service indication information indicates that there is no data packet that is in the plurality of data packets and whose service type is the same as that of the first data packet, control the transceiver module 920 to send an acknowledgment frame to the second station.

The block acknowledgment frame includes acknowledgment information of the first data packet, and the acknowledgment frame is an acknowledgment of the first data packet.

Optionally, the block acknowledgment frame is an independent block acknowledgment frame, or the block acknowledgment frame is a block acknowledgment subframe in a multi-station acknowledgment frame.

Optionally, the acknowledgment frame is an acknowledgment subframe in the multi-station acknowledgment frame.

In the embodiments, the first station receives the at least one first data packet in the plurality of data packets sent by the second station on the plurality of spectrum resources, and replies the acknowledgment information of the at least one first data packet to the second station based on the multi-service indication information carried in the at least one first data packet, to avoid a problem of confusion in acknowledgment information of the plurality of data packets.

Figure 10:
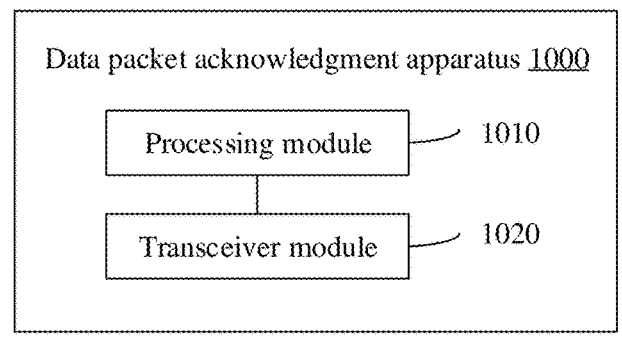
FIG. 10 is a structural block diagram of a data packet acknowledgment apparatus according to an embodiment.

FIG. 10 is a block diagram of a data packet acknowledgment apparatus 1000 according to an embodiment. The data packet acknowledgment apparatus 1000 includes a processing module 1010 and a transceiver module 1020.

The processing module 1010 is configured to control the transceiver module 1020 to send a plurality of data packets to a first station on a plurality of spectrum resources.

The plurality of data packets include at least one first data packet, each of the plurality of data packets or the at least one first data packet carries multi-service indication information, and the multi-service indication information is used to indicate whether there is a data packet that is in the plurality of data packets and whose service type is the same as that of the first data packet.

Optionally, the plurality of data packets may be a single one MPDU, or may be a block acknowledgment enabled A-MPDU, or a multi-station acknowledgment enabled Multi-TID A-MPDU.

Optionally, the plurality of data packets include at most one MPDU encapsulated by the MMPDU.

Optionally, the first data packet is a single one MPDU, and the single one MPDU may be one of an S-MPDU, an Ack-enabled MPDU, and an EOF MPDU.

Optionally, the plurality of spectrum resources are a plurality of channels or a plurality of resource units that belong to a same frequency band, or the plurality of spectrum resources are a plurality of channels or a plurality of resource units that belong to different frequency bands.

The processing module 1010 is configured to control the transceiver module 1020 to receive acknowledgment information of the at least one first data packet replied by the first station.

In a possible implementation:

The processing module 1010 is configured to: if the multi-service indication information indicates that there is a data packet that is in the plurality of data packets and whose service type is the same as that of the first data packet, control the transceiver module 1020 to receive a block acknowledgment frame replied by the first station; or if the multi-service indication information indicates that there is no data packet that is in the plurality of data packets and whose service type is the same as that of the first data packet, control the transceiver module 1020 to receive an acknowledgment frame replied by the first station.

The block acknowledgment frame includes acknowledgment information of the first data packet, and the acknowledgment frame is an acknowledgment of the first data packet.

Optionally, the block acknowledgment frame is an independent block acknowledgment frame, or the block acknowledgment frame is a block acknowledgment subframe in a multi-station acknowledgment frame.

Optionally, the acknowledgment frame is an acknowledgment subframe in the multi-station acknowledgment frame.

In this embodiment, when a second station sends the plurality of data packets to the first station on the plurality of spectrum resources, after the first station receives the at least one first data packet in the plurality of data packets sent by the second station on the plurality of spectrum resources, the first station is enabled to reply the acknowledgment information of the at least one first data packet to the second station based on the multi-service indication information carried in the at least one first data packet, to avoid a problem of confusion in acknowledgment information of the plurality of data packets.

Figure 11:
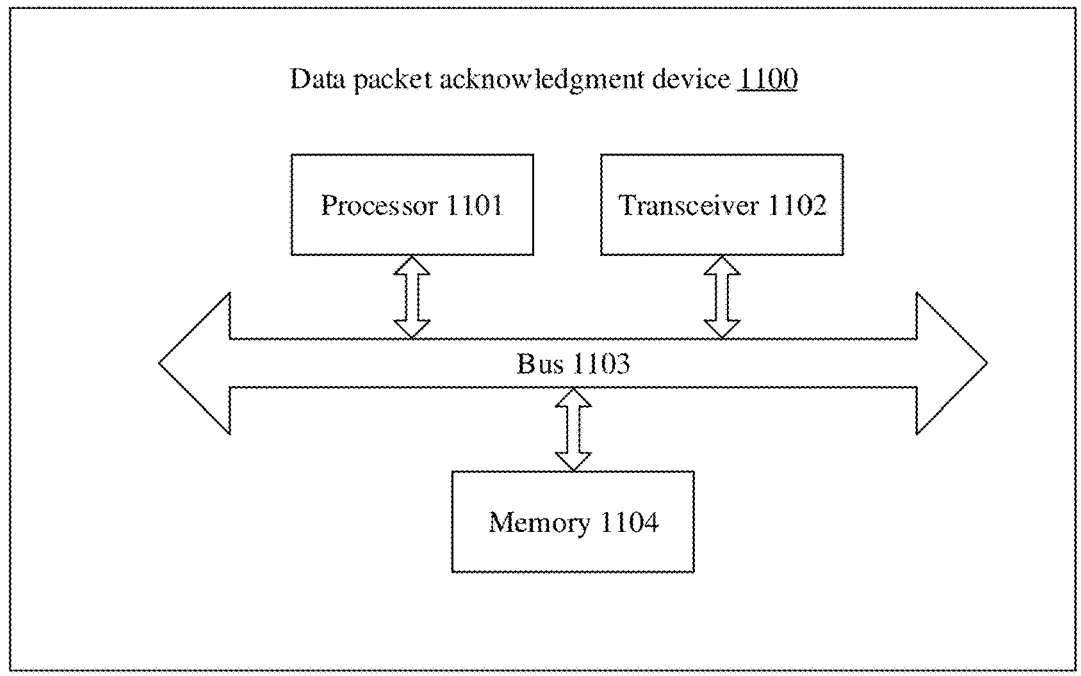
FIG. 11 is a structural block diagram of a data packet acknowledgment device according to an embodiment.

FIG. 11 is a schematic structural diagram of a data packet acknowledgment device 1100 according to an embodiment. As shown in FIG. 11, the data packet acknowledgment device 1100 includes a processor 1101 and a transceiver 1102. Optionally, the data packet acknowledgment device 1100 further includes a memory 1104. The processor 1101, the transceiver 1102, and the memory 1104 communicate with each other by using a bus 1104, or may communicate by using another manner such as wireless transmission. The processor 1101 is configured to control the transceiver 1102 to perform a sending or receiving operation.

It can be understood that the data packet acknowledgment device 1100 according to this embodiment may be the data packet acknowledgment apparatus 900 shown in FIG. 9 in the embodiments. In this case, the processor 1101 may control the transceiver 1102 to receive at least one first data packet in a plurality of data packets sent by a second station on a plurality of spectrum resources, where the plurality of data packets include the at least one first data packet, each of the plurality of data packets or the at least one first data packet carries multi-service indication information, and the multi-service indication information is used to indicate whether there is a data packet that is in the plurality of data packets and whose service type is the same as that of the first data packet; and the processor 1101 is further configured to control the transceiver 1102 to reply acknowledgment information of the at least one first data packet to the second station based on the multi-service indication information.

It can also be understood that the data packet acknowledgment device 1100 according to this embodiment may alternatively be the data packet acknowledgment apparatus 1000 shown in FIG. 10. In this case, the processor 1101 may control the transceiver 1102 to send a plurality of data packets to a first station on a plurality of spectrum resources, where the plurality of data packets include at least one first data packet, each of the plurality of data packets or the at least one first data packet carries multi-service indication information, and the multi-service indication information is used to indicate whether there is a data packet that is in the plurality of data packets and whose service type is the same as that of the first data packet; and the processor 1101 is further configured to control the transceiver 1102 to receive acknowledgment information of the at least one first data packet replied by the first station.

The data packet acknowledgment device 1100 in this embodiment may be the data packet acknowledgment apparatus 900 shown in FIG. 9 or the data packet acknowledgment apparatus 1000 shown in FIG. 10 in the embodiments. For details, refer to the foregoing method descriptions. Details are not described herein again.

It can be understood that in the embodiment, the processor 1101 may be a CPU, or the processor 1101 may be another general purpose processor, a digital signal processor (DSP), an application-specific integrated circuit (ASIC), a field programmable gate array (FPGA), or another programmable logic device, a discrete gate or a transistor logic device, a discrete hardware component, or the like. The general purpose processor may be a microprocessor or any conventional processor or the like. It can be noted that the processor 1101 may be a processor that supports an ARM architecture.

The transceiver 1102 is configured to send and/or receive data information and the like, and the transceiver 1102 may be a wireless or wired transceiver, for example, a radio module and an antenna module. The transceiver 1102 may include one or more antennas, and may be an array antenna or the like.

The memory 1104 may include a read-only memory and a random access memory, and may be configured to: store an instruction or store program code, and provide the instruction and data to the processor 1101. The memory 1104 may further include a non-volatile random access memory. For example, the memory 1104 may further store information about a device type.

The memory 1104 may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory ( ), and is used as an external cache. Through examples but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

The bus 1103 may further include a power bus, a control bus, a status signal bus, and the like, in addition to a data bus. However, for clear description, various types of buses in the figure are marked as the bus 1103.

An embodiment further provides a non-transitory computer-readable storage medium. When an instruction in the storage medium is executed by a processor of a computing system, the computing system is enabled to perform any one of the data packet acknowledgment methods according to FIG. 8.

A computer program product including an instruction is provided. When the computer program product runs on a computer, the computer is enabled to execute an instruction for performing any one of the data packet acknowledgment methods according to FIG. 8.

All or some of the foregoing embodiments may be implemented by using software, hardware, firmware, or any combination thereof. When the software is used for implementation, all or some of the embodiments may be implemented in a form of the computer program product. The computer program product includes one or more computer instructions. When the computer program instructions are loaded and executed on an apparatus, the procedures or functions according to the embodiments are all or partially generated. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial optical cable, an optical fiber, or a digital subscriber line) or wireless (for example, infrared, radio, or microwave) manner. The computer-readable storage medium may be any usable medium accessible by the apparatus, or a data storage device, such as a server or a data center integrating one or more usable media. The usable medium may be a magnetic medium (for example, a floppy disk, a hard disk, or a magnetic tape), an optical medium (for example, a digital video disk (DVD)), or a semiconductor medium (for example, a solid-state drive).

The sequence numbers of the foregoing embodiments are merely for illustrative purposes, and does not indicate priorities of the embodiments.

The foregoing descriptions are merely optional embodiments, but are not limiting. Any modification, equivalent replacement, or improvement made without departing from the spirit and principle of the embodiments fall within the protection scope of this application.

What is claimed is:

1. A data packet acknowledgment apparatus comprising a processor and a transceiver connected to the processor, wherein the processor is configured to control the transceiver to receive and reply and the transceiver is configured to:
    receive at least one first data packet in a plurality of data packets sent by a second station on a plurality of spectrum resources, wherein the plurality of data packets comprise the at least one first data packet, each of the plurality of data packets or the at least one first data packet carries multi-service indication information, and the multi-service indication information is used to indicate whether there is a data packet that is in the plurality of data packets and whose service type is the same as that of the first data packet;
    reply to acknowledgment information of the at least one first data packet to the second station, based on the multi-service indication information; and
    aggregate data packets that belong to different service types using a multistation acknowledgment frame.

2. The apparatus according to claim 1, wherein the processor is further configured to:
    if the multi-service indication information indicates that there is a data packet that is in the plurality of data packets and whose service type is the same as that of the first data packet, control the transceiver module to send a block acknowledgment frame to the second station, wherein the block acknowledgment frame comprises acknowledgment information of the first data packet; or
    if the multi-service indication information indicates that there is no data packet that is in the plurality of data packets and whose service type is the same as that of the first data packet, control the transceiver module to send an acknowledgment frame to the second station, wherein the acknowledgment frame is an acknowledgment of the first data packet.

3. The apparatus according to claim 2, wherein the block acknowledgment frame is an independent block acknowledgment frame, or the block acknowledgment frame is a block acknowledgment subframe in a multi-station acknowledgment frame.

4. The apparatus according to claim 2, wherein the acknowledgment frame is an acknowledgment subframe in a multi-station acknowledgment frame.

5. The apparatus according to claim 1, wherein the first data packet is a single one media access control protocol data unit MPDU, and the single one MPDU is one of a single MPDU, an end of frame MPDU, and an acknowledgment enabled aggregate MPDU.

6. The apparatus according to claim 1, wherein the plurality of spectrum resources are a plurality of channels or a plurality of resource units that belong to a same frequency band, or the plurality of spectrum resources are a plurality of channels or a plurality of resource units that belong to different frequency bands.

7. An apparatus comprising a processor and a transceiver connected to the processor, wherein the processor is configured to control the transceiver to send and receive and the transceiver is configured to:
send a plurality of data packets to a first station on a plurality of spectrum resources, wherein the plurality of data packets comprise at least one first data packet, each of the plurality of data packets or the at least one first data packet carries multi-service indication information, and the multi-service indication information is used to indicate whether there is a data packet that is in the plurality of data packets and whose service type is the same as that of the first data packet;
receive acknowledgment information of the at least one first data packet replied by the first station; and
aggregate data packets that belong to different service types using a multistation acknowledgment frame.

8. The apparatus according to claim 7, wherein the processor is configured to:
if the multi-service indication information indicates that there is a data packet that is in the plurality of data packets and whose service type is the same as that of the first data packet, control the transceiver module to receive a block acknowledgment frame replied by the first station, wherein the block acknowledgment frame comprises acknowledgment information of the first data packet; or
if the multi-service indication information indicates that there is no data packet that is in the plurality of data packets and whose service type is the same as that of the first data packet, control the transceiver module to receive an acknowledgment frame replied by the first station, wherein the acknowledgment frame is an acknowledgment of the first data packet.

9. The apparatus according to claim 8, wherein the block acknowledgment frame is an independent block acknowledgment frame, or the block acknowledgment frame is a block acknowledgment subframe in a multi-station acknowledgment frame.

10. The apparatus according to claim 8, wherein the acknowledgment frame is an acknowledgment subframe in a multi-station acknowledgment frame.

11. The apparatus according to claim 7, wherein the first data packet is a single one media access control protocol data unit MPDU, and the single one MPDU is one of a single MPDU, an end of frame MPDU, and an acknowledgment enabled aggregate MPDU.

12. The apparatus according to claim 7, wherein the plurality of spectrum resources are a plurality of channels or a plurality of resource units that belong to a same frequency band, or the plurality of spectrum resources are a plurality of channels or a plurality of resource units that belong to different frequency bands.

13. A method comprising:
receiving at least one first data packet in a plurality of data packets sent by a second station on a plurality of spectrum resources, wherein the plurality of data packets comprise the at least one first data packet, each of the plurality of data packets or the at least one first data packet carries multi-service indication information, and the multi-service indication information is used to indicate whether there is a data packet that is in the plurality of data packets and whose service type is the same as that of the first data packet;
replying to acknowledgment information of the at least one first data packet to the second station based on the multi-service indication information; and
aggregating data packets that belong to different service types using a multistation acknowledgment frame.

14. The method according to claim 13, wherein the replying of acknowledgment information of the at least one first data packet to the second station based on the multi-service indication information comprises:
if the multi-service indication information indicates that there is a data packet that is in the plurality of data packets and whose service type is the same as that of the first data packet, sending a block acknowledgment frame to the second station, wherein the block acknowledgment frame comprises acknowledgment information of the first data packet; or
if the multi-service indication information indicates that there is no data packet that is in the plurality of data packets and whose service type is the same as that of the first data packet, sending an acknowledgment frame to the second station, wherein the acknowledgment frame is an acknowledgment of the first data packet.

15. The method according to claim 14, wherein the block acknowledgment frame is an independent block acknowledgment frame, or the block acknowledgment frame is a block acknowledgment subframe in a multi-station acknowledgment frame.

16. The method according to claim 14, wherein the acknowledgment frame is an acknowledgment subframe in a multi-station acknowledgment frame.

17. The method according to claim 13, wherein the first data packet is a single one media access control protocol data unit MPDU, and the single one MPDU is one of a single MPDU, an end of frame MPDU, and an acknowledgment enabled aggregate MPDU.

18. The method according to claim 13, wherein the plurality of spectrum resources are a plurality of channels or a plurality of resource units that belong to a same frequency band, or the plurality of spectrum resources are a plurality of channels or a plurality of resource units that belong to different frequency bands.

* * * * *